June 6, 1950  J. A. HERBST  2,510,107
RADIO DIRECTION FINDER
Filed April 4, 1946  2 Sheets-Sheet 1
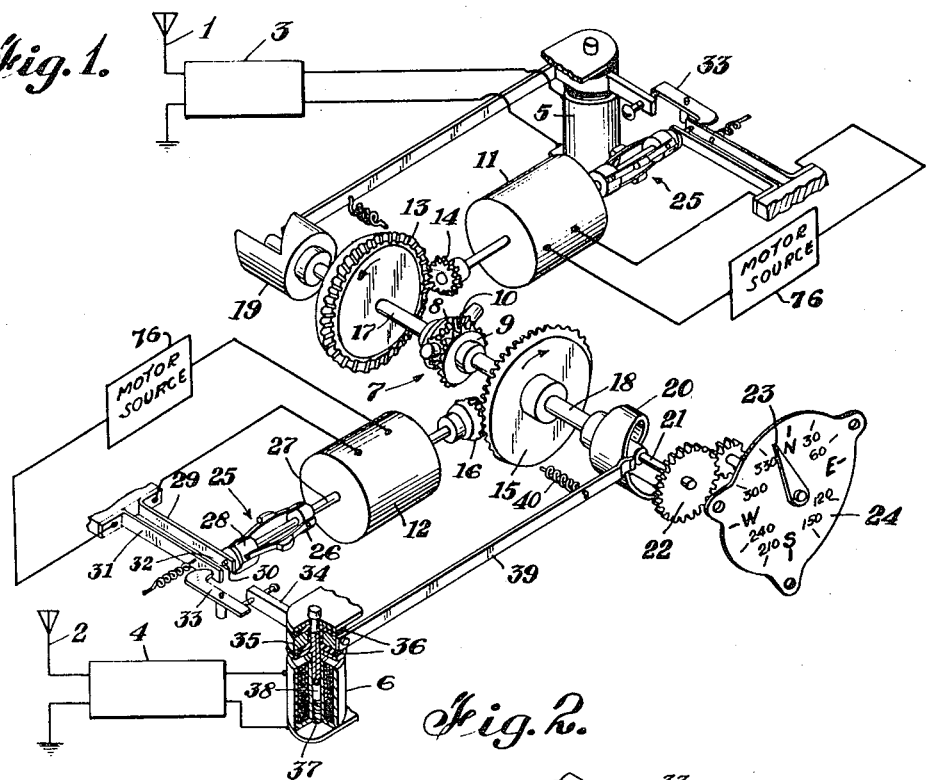
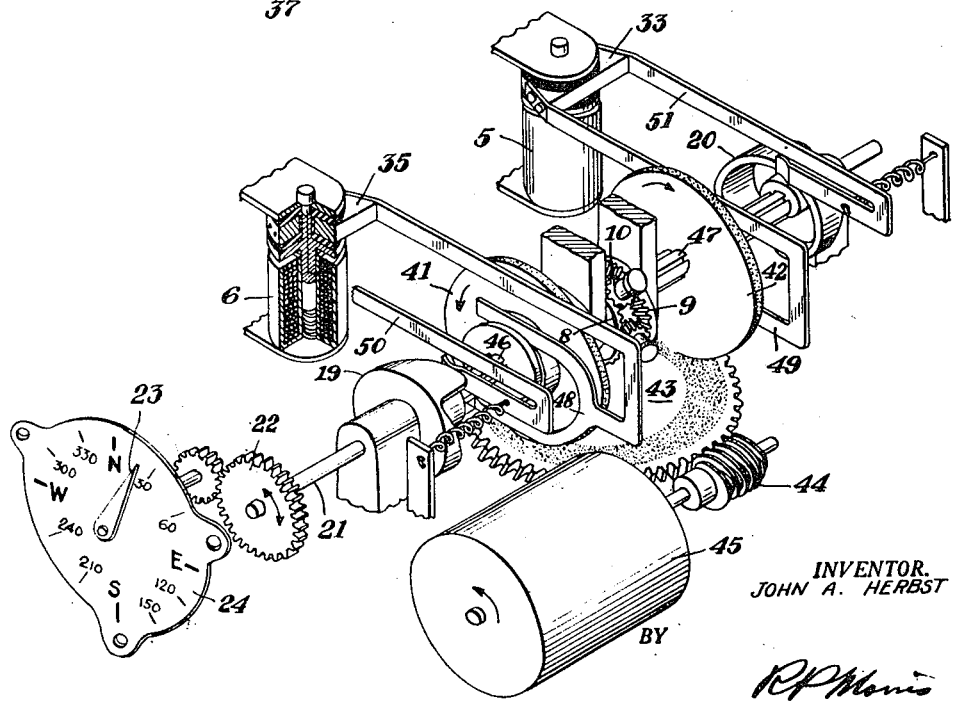
INVENTOR.
JOHN A. HERBST
BY
ATTORNEY

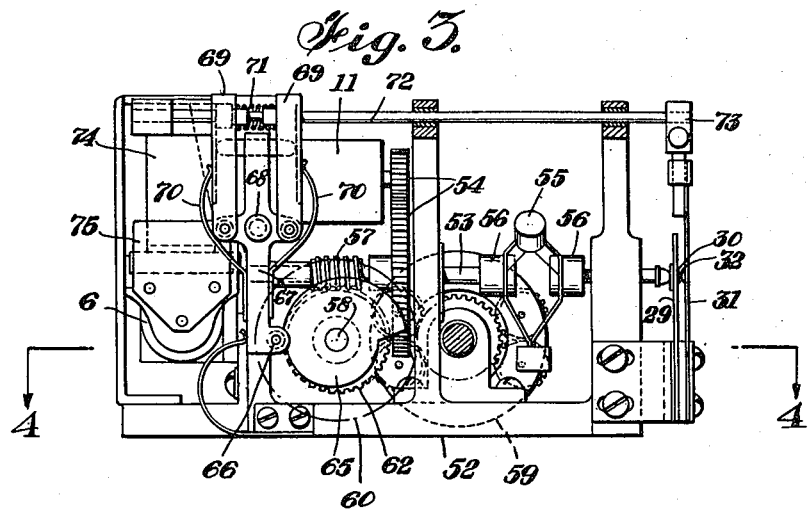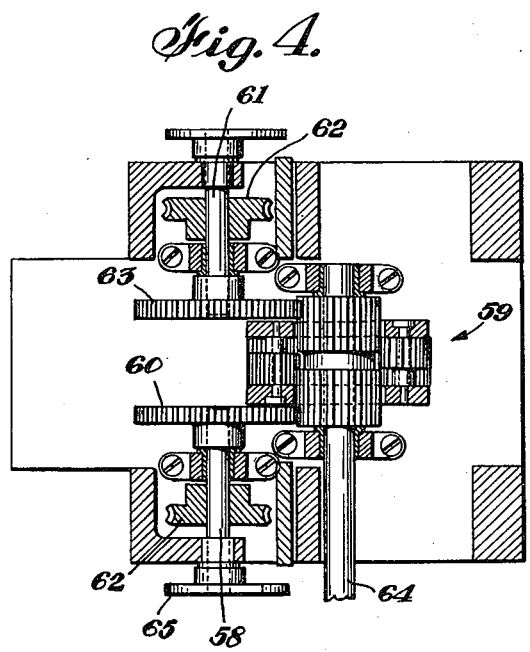

Patented June 6, 1950

2,510,107

UNITED STATES PATENT OFFICE 2,510,107

RADIO DIRECTION FINDER

John A. Herbst, Pines Lake, N. J., assignor to Federal Telephone & Radio Corporation, New York, N. Y., a corporation of Delaware Application April 4, 1946, Serial No. 659,483

7 Claims. (Cl. 343—113)

This invention relates to an azimuth indicating device. More particularly, it deals with a radio direction finder for indicating at the proper type of a radio receiving station the azimuthal location or direction of motion of that station with respect to a given fixed reference radio transmitter station.

The transmitting station with which the receiver of this invention is particularly adapted to cooperate, comprises an omni-directional antenna or beacon and a directional antenna or beacon. The directional antenna is rotated at a constant speed, say one revolution per second, and each time the rotating means crosses a fixed reference direction, say north, the omni-directional beacon sends out a signal. Accordingly, at a distance from the transmitter two series of signals can be detected; one, the reference pulse series and the other the pulses provided as a directional beacon passes the receiver. The frequency or repetition of these signals is the same, but the phase relationship is different for different azimuthal positions of the receiver with respect to the transmitter. The azimuth is determined by measuring this difference in phase relationship in the device of this invention. Different beacons, say along a route, may be characterized and identified by different carrier frequencies and/or by different antenna rotating speeds. Also, the carrier waves, radiated by the directional and omni-directional antenna of each station may be different, or different characteristics may be given to the signals radiated therefrom, so that they may be identified at the receiver.

It is an object of this invention to provide a novel and effective azimuth indicator.

Another object is to provide a visual direction finder for vehicles, including aircraft and boats.

Another object is to provide a visual direction finder indicator mechanically operated to give continuous azimuthal direction indications.

Another object is to provide a reliable indicator for showing visually the timing or phase relation of received signals corresponding relative to the azimuthal location of the transmitter and receiver with respect to a reference direction.

Still other objects will appear from time to time in the description which follows:

According to a feature of this invention trains of pulses are detected and compared to indicate the phase relation in terms of azimuthal degrees. One mechanical embodiment of the azimuth indicator of this invention, operated by pulses from a rotating directional beacon and an omni-directional reference beacon synchronized with the rotating beacon, comprises: (1) means to receive the signals from each of said beacons, (2) separate motors operated in synchronism with the pulse repetition rate of the train of pulses from each beacon, (3) a differential comprising a differential pinion assembly and two differential gears rotated in opposite directions one by each motor, and (4) means coupled to the differential pinion assembly to indicate any change in synchronism between the two motors due to the relative change in phase of the separate pulse trains received from the beacons due to relative change in position of the receiving station.

The means (2) for maintaining the two motors in synchronism with the pulse repetition rate of the two pulse trains may comprise relays controlled by the received pulse trains to operate clutch mechanisms for releasing spring-applied cam followers riding on cams on the shafts of each gear of the differential, and these cam followers may control speed governor switches on each motor to maintain them in synchronism with the pulse repetition rates of the received pulse trains.

While this invention itself is defined in the appended claims, the foregoing and other features and objects of the invention will become more apparent and the invention best understood upon consideration of the following detailed descriptions of embodiments of the invention to be read in connection with the accompanying drawings, in which:

Figs. 1 and 2 are schematic perspective views of two mechanical embodiments of this invention;

Fig. 3 is a side elevation of another mechanical embodiment of this invention; and Fig. 4 is a sectional view taken along the lines 4—4 of Fig. 3.

Referring to Fig. 1, the pulse modulated high frequency carrier waves are picked up by separate non-directional antennas 1 and 2, or by a common antenna, and are separately amplified and detected by receivers 3 and 4. The pulses in the output circuits are applied directly to solenoids 5 and 6, the functions of which will be later explained. At 7 is shown a conventional differential comprising differential, sun or bevel gears 8 and 9 meshed on opposite sides with differential pinions or planetary gears 10. The bevel gears are driven in opposite directions at equal speeds by motors 11 and 12, through reduction gears 13 and 14, and 15 and 16. The gear shafts 17 and 18 are keyed solidly to the bevel gears 8 and 9 and to the reduction gears 13 and 15, as well as to the cylindrical cams 19 and 20. The shafts 17 and 18 are hollow and turn freely on shaft 21 which is keyed at its center to the spider of pinions 10, and is keyed at one end to dial drive gear 22. By extending shaft 21 throughout the length of shafts 17 and 18, alignment of the shafts and gears is facilitated. Pointer 23 of dial 24 is turned by the dial drive gear 22 on shaft 21.

It is now apparent that the dial pointer will stand still while motors 11 and 12 are running at the same speed and that the pointer will move only while the motor speeds are different.

Means for making the motor speeds responsive, respectively, to the received pulses will now be described. The control mechanisms for the two motors are identical, and like reference characters will be applied to like parts. The speed of the motors is held constant, in the embodiment of Fig. 1, by fly-ball governors 25. These governors 25 comprise a fixed collar 26 mounted on motor shaft 27 and an axially slidable collar 28 which may be attached to the leaf spring 29 carrying an electrical contact 30. Cooperating with the spring 29 is a similar leaf spring 31 carrying a cooperating electrical contact 32 which may be adjusted at different distances from the contact 30 by lever 33. Energization of the motors 11 and 12 is made through these contacts 30 and 32 with sources 76. Thus, the speed of the motor may be momentarily increased and decreased by changing the gaps between the contacts 30 and 32 by adjustment of the lever arms 33. The position of this lever arm 33 depends upon the position of the arm 34 adjustably cooperating with lever 33 which arm 34 extends from the side of the follow-up block 35. This block 35 is a round flattened disc held between spring-pressed friction washers 36. The spring 37 acting through the iron plunger 38 maintains sufficient pressure on the washers and block to lock the block against rotational movement, but energization of the solenoid winding pulls the plunger down, compresses the spring, and releases the pressure so that the block is free to turn. While free, the block may follow the cam follower 39 which rides on the spiral surface of the cylindrical cam 20. The cam follower is a relatively long and semi-rigid arm so that, under the positive drive of the cam, the follower will remain straight and pivot the block when the block is free, yet will flex when the block is locked. The springs 40 keep the follower on the cam surface. The best results may be obtained if cam speed variations are kept within limits of plus or minus 25 percent of the average operating speed. The motor speeds and gear ratios are chosen for example, so that the cams will turn 1 revolution in from ¾ second to 1¼ seconds, when the received pulse frequency is one pulse per second.

Assume now that the receivers are tuned to the pulse carriers and that the pulses, at a frequency of 60 per minute, are applied to the solenoids. The first pulse received releases the follow-up block which assumes a position determined by the cam and cam follower at the instant of the pulse. At the end of the pulse the follow-up block is relocked and the speed of the motor and the cam driven by the motor is fixed by the governor and the setting of gap between contacts 30 and 32 on leaf springs 29 and 31. When the next pulse is received and applied to the solenoid, one of three conditions may obtain, namely: (1) the cam may have revolved exactly one revolution, or (2) less than one revolution, or (3) more than one revolution. If the cam has revolved exactly one revolution when the second pulse energizes the solenoid, the cam follower arm is straight and no change occurs in the position of the follow-up block or in the speed of the motor. If the cam has revolved less than one revolution, when the second pulse arrives, the cam follower will be at a point on the cam lower than it was at the time of the first pulse, whereupon the follow-up block assumes a new position, the gap between contacts 30 and 32 reduces and the motor and cam speed increases, this sequence of operations being repeated until the cam speed reaches the speed corresponding to the frequency of the received pulses. If the cam has revolved more than one revolution, the motor and cam speed decreases, and continues to decrease during two, three or more pulse intervals until the speed matches the pulse frequency.

Since the two trains of pulses received from a transmitting station are of the same pulse repetition frequency, the two motors and their bevel gears, will have equal speeds, and the planetary gears or pinions and the connected dial pointer will remain stationary. If now the receiver changes its azimuthal position with respect to the transmitter, as by movement of the craft carrying the receiver, the time phase of one pulse train changes with respect to the other. A stationary transmitter is assumed. A pulse phase change requires, of course, a momentary frequency change, the extent of the phase change being proportional to the rate and duration of frequency change. Hence a pulse phase change, occasioned by a change in azimuthal position, causes the speed of one motor to change with respect to the other, the rate and duration of the speed change being determined by the movement of the receiver. Accordingly, the rate and duration of movement of the dial pointer follows the movement of the receiver and at all times indicates its true azimuthal position.

If, for any reason the reception of pulses is interrupted, the mechanism remembers the azimuthal velocity and continues to indicate on that basis. If, the receiver was stationary or moving on a line radiating from the transmitter, the velocity would be zero and the pointer would remain stationary. If, the receiver was moving in any other direction, the pointer would be continuously moving. This motion is, as explained above, produced by the difference in speed of the two motors. If, no pulses are received, the pointer continues to move at the rate existing at the time the pulses were interrupted.

An alternative mechanism, shown in Fig. 2, embodies the characteristic features of my invention, yet requires only one motor. The two wheels 41 and 42 correspond in function with the gears 13 and 15 of Fig. 1, and are driven by friction with the face of the toothed gear 43, which in turn is driven by the worm gear 44 on the shaft of motor 45. The wheels 41 and 42 are splined to the shafts 46 and 47 and are free to slide on the shafts. Cams 19 and 20 are keyed to shafts 46 and 47, respectively and speed changes of the cams are effected by moving the wheels 41 and 42 across the face of the gear 43. The positions of the wheels 41 and 42 on gear 43 are controlled by yokes 48 and 49 carried on the follow-up block 35, the block positions in turn being determined by the followers 50 and 51 on the cams, as in Fig. 1. The splined shafts are keyed to the bevel gears 8 and 9 of the differential assembly and the planetary gears or pinions 10 drive the dial pointer 23 through the inner coaxial shaft 21.

In operation the pulses unlock the follow-up blocks each revolution of the cams and the followers move the yokes 48 and 49 and slide the wheels 41 and 42 inward or outward on gear 43 depending on whether an increase or decrease in speed is called for. As in Fig. 1, a phase shift in the pulses causes a differential speed change and a corresponding change in the position of the dial pointer.

Referring now to Figs. 3 and 4, the device of this invention is shown mounted in a single frame 52 in which the two motors 11 and 12 are mounted at the upper left hand corner beside each other and drive two parallel shafts 53 through reduction gears 54. On these shafts 53 are mounted the governors 55 which may be similar to the governors 25. The speed governors 55 shown in Fig. 3 however produce a greater axial movement between the collars 56 for the same change in speed on the shaft 53, than does the governor 25 due to its different geometric construction, which permits more accurate control of the gaps between the contacts 30 and 32 mounted on each spring 29, and 31, respectively.

Instead of having the rotating cam mechanism mounted on the shaft 53 it is driven through a worm gear 57 and mounted on the transverse shaft 58 connected to the differential mechanism 59 by means of spur gear 60. Similarly, for the other motor and mechanism is provided the shaft 61, worm gear 62 and spur gear 63 for driving the other differential or sun gear of the differential mechanism 59. The planetary or pinion gear assembly for the differential 59 is coupled to the shaft 64 upon which the pointer 23 may be mounted for indicating direction on the dial 24, as shown in Fig. 1 or 2.

In the device shown in Figs. 3 and 4 the cam surface is shown to be spiral instead of helix, as previously shown in the other two figures. This cam surface 65 is followed by a spring engaged cam follower 66 mounted on lever 67 pivoted at 68. Also mounted from lever 67 are a pair of arms 69 urged toward each other by the springs 70 a pair of fixed collars and helical spring 71 on the axially slidable rod 72. At ends 73 of rod 72 are fastened leaf springs 31 carrying contacts 32. The rod 72 is prevented from horizontal axial movement by frictional engagement of the plate 74 between the spring actuated jaws 75. These jaws 75 are operated by the solenoid 6 so that when the pulse is received the jaws 75 are opened and the rod 72 is free to move axially adjusting the contacts 32 according to the position of the cam follower 66 on the cam 65.

While I have described particular embodiments of my invention to aid in the explanation thereof, such description is only illustrative and not limitative, and it should be understood that various modifications and adaptations thereof, may be made within the scope of the invention.

I claim:

1. In direction finding, the method of determining the variable time phase of pulses of two series of pulses of like repetition rates, comprising producing a component driving motion associated with each series of pulses to effect a resultant differential driving motion, adjusting the speed of each of the said component motions a fixed amount in response to the occurrence of a pulse in a respective series of pulses, controlling the amount of adjustment in accordance with the relative change in the repetition rates of the pulses and the speed of associated motors, and indicating the space phase of said components by said differential motion.

2. In an azimuth indication device operated by radio pulse signals from a rotating directional beacon and an omni-directional reference pulse beacon synchronized with said rotating beacon, means to receive said signals, a respective motor corresponding to said directional and omni-directional beacon signals, means responsive to reception of each of said signals for adjusting the speed of a respective motor a fixed amount, means for controlling the amount of adjustment in accordance with the difference between the occurrence rate of each of the received signals and the speed of a respective motor, separate shafts driven by said motors in opposite directions connected to each side of a differential comprising a pinion gear assembly, and means connected to the pinion gear assembly of said differential for indicating the phase difference between said motor due to the relative occurrence rates of said signals.

3. An azimuth indication device operated by radio pulse signals from a rotating directional beacon at a given repetition rate and an omni-directional reference pulse beacon synchronized with said rotating beacon comprising: means to receive said signals, separate motors, means responsive to each of said pulse signals for adjusting the speed of a respective motor a fixed amount, means for comparing the phasing of the rotation of each of said motors with the repetition rate of a respective received pulse signal, means for controlling the amount of adjustment comprising means coupled to the output of said comparing means, a differential comprising a pinion gear support, separate shafts driven by said motors in opposite directions connected to each side of said differential, and means connected to the pinion gear support of said differential for indicating the change in phase between said motors due to relative change in phase rates of said pulse signals.

4. An azimuth indication device operated by separate radio pulse signals of a given repetition rate and duration from a rotating directional beacon and an omni-directional reference pulse beacon synchronized with said rotating beacon comprising: means to receive said signals, a separate motor associated with each of said separate signals, separate means to adjust the speed of each of said motors a fixed amount in response to receipt of a respective signal, means for comparing the phasing of rotation of each of said motors with the repetition rate of a respective received signal and means responsive to said control signal upon receipt of a pulse signal for controlling the amount of adjustment of a respective motor, a differential mechanism comprising a planetary gear support, separate shafts driven by said motors in opposite directions connected to each side of said differential mechanism, means connected to the planetary gear support of said differential mechanism for indicating the change in synchronism between said motors due to relative change in the time of reception of said signals.

5. An arrangement according to claim 4, wherein each of said motors comprise a speed governor having a pair of adjustable electrical contacts and said means for adjusting the speed of each motor comprises means for adjusting said contacts in accordance with a respective control signal.

6. An arrangement according to claim 4, wherein each of said motors comprises an adjustable speed control circuit, and said speed adjusting means comprises means responsive to the receipt of a pulse signal for adjusting said speed control circuit a fixed amount in accordance with a respective control signal.

7. An azimuth indicating device operated by separate radio pulse signals of a given repetition rate and duration from a rotating directional beacon and an omni-directional reference pulse direction beacon synchronized with said rotating beacon comprising: means to receive pulses from each of said beacons, a separate motor associated with each of said separate signals, means for adjusting the speed of each motor a fixed amount in response to the receipt of a respective signal, means for continuously comparing the phase of rotation of each of said motors with the time of receipt of a respective signal for deriving a control signal, means responsive to the receipt of a pulse signal for controlling the amount of adjustment of each motor for said duration in accordance with the value of a respective control signal, a differential mechanism comprising a pinion gear assembly, separate shafts driven by said motors in opposite directions connected to each side of said differential mechanism, and means connected to the pinion gear assembly of said differential mechanism for indicating the relative change in the phase of rotation of said motors due to the relative change at the time of reception of said signals.

JOHN A. HERBST.

REFERENCES CITED

The following references are of record in the file of this patent:

UNITED STATES PATENTS

| Number | Name | Date |
|---|---|---|
| 1,029,362 | Hall | June 11, 1912 |
| 1,540,272 | Merrill | June 2, 1925 |
| 1,907,132 | Thurston | May 2, 1933 |
| 1,988,006 | Greig | Jan. 15, 1935 |
| 2,036,983 | Ryan | Apr. 7, 1936 |
| 2,296,041 | Luck | Sept. 15, 1942 |
| 2,345,805 | Gibson | Apr. 4, 1944 |
| 2,366,583 | Williams | Jan. 2, 1945 |
| 2,372,633 | Angold et al. | Mar. 27, 1945 |
| 2,387,569 | Eggers | Oct. 23, 1945 |